United States Patent [19]

Stich et al.

[11] Patent Number: 4,844,124
[45] Date of Patent: Jul. 4, 1989

[54] HYDROSTATIC ROTARY CONNECTOR WITH PRESSURE-EQUALIZING OR COMPENSATING ELEMENT

[75] Inventors: Bodo Stich, Wiesbaden; Slawomir Adamowicz, Taunsstein, both of Fed. Rep. of Germany

[73] Assignee: Glyco-Antriebstechnik GmbH, Wiesbaden, Fed. Rep. of Germany

[21] Appl. No.: 187,616

[22] Filed: Apr. 28, 1988

[30] Foreign Application Priority Data

Apr. 28, 1987 [DE] Fed. Rep. of Germany ....... 3714103
Apr. 28, 1987 [DE] Fed. Rep. of Germany ....... 3812363

[51] Int. Cl.[4] .............................................. F16L 27/00
[52] U.S. Cl. ...................................... 137/580; 277/15; 277/75; 277/83
[58] Field of Search ................... 137/580; 277/73–76, 277/3, 15, 83, 173–177

Primary Examiner—A. Michael Chambers
Attorney, Agent, or Firm—Herbert Dubno

[57] ABSTRACT

A rotary connector for fluid transmission between a housing part and a shaft via rings has a bypass provided with a valve which connects the intermediate pressure space with either the leakage space or the main pressure space upon a drop in the main pressure below the pressure in the intermediate pressure space to provide inverse gap control and thereby prevent the sliding ring from pressing mechanically against the counter-ring and generating sliding friction, heat and wear.

12 Claims, 3 Drawing Sheets

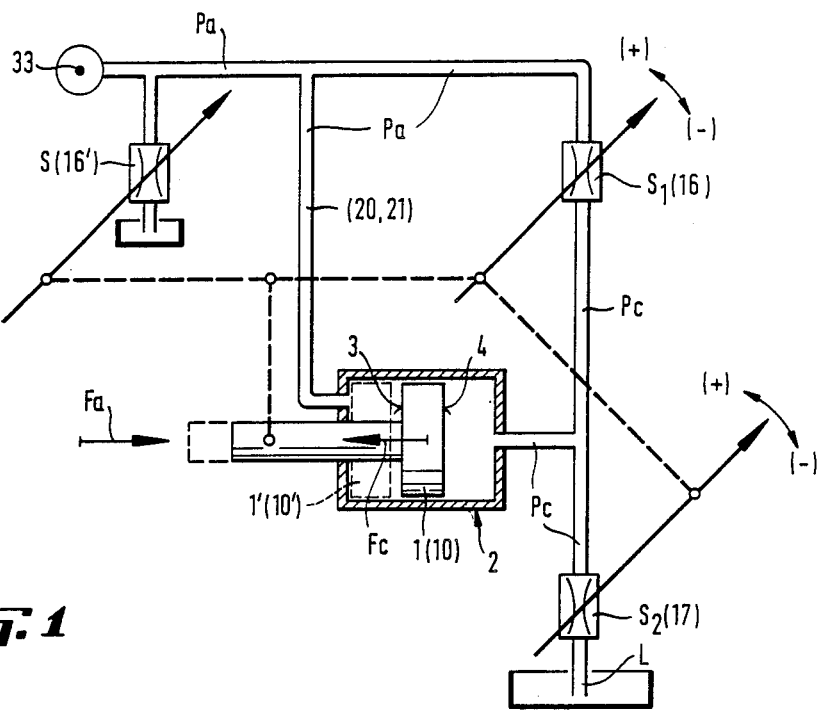
_Fig. 1_
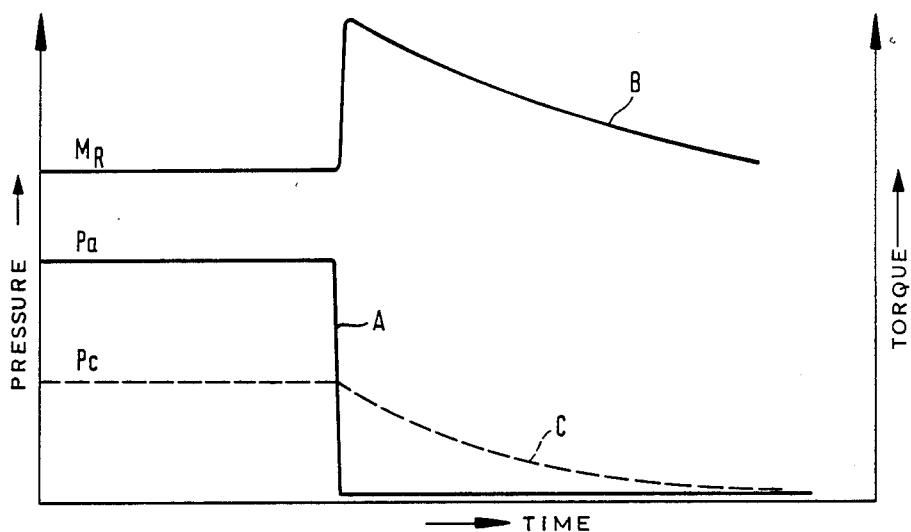
_Fig. 1 a._

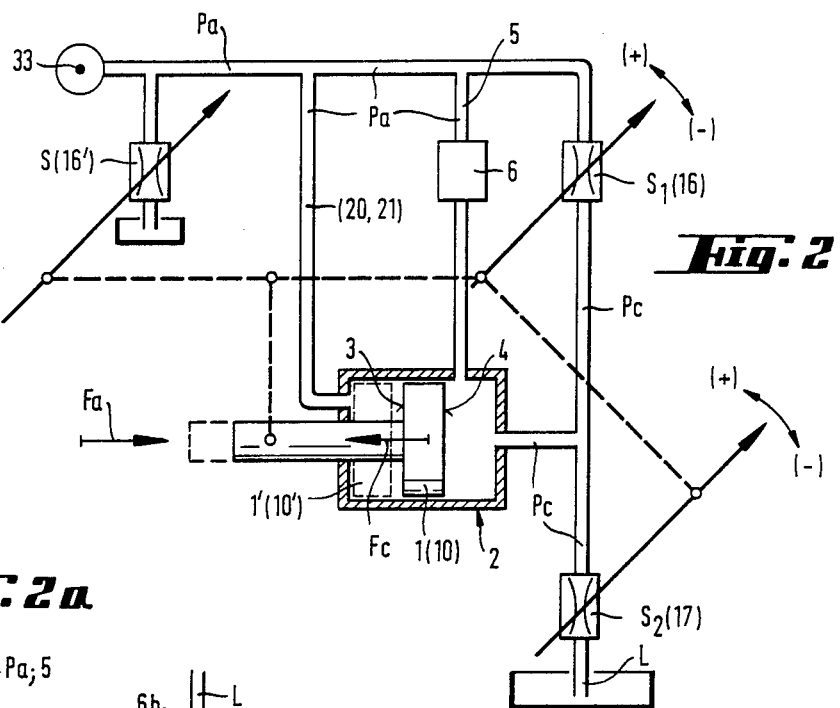
*Fig. 2*
*Fig. 2a*
*Fig. 2b*
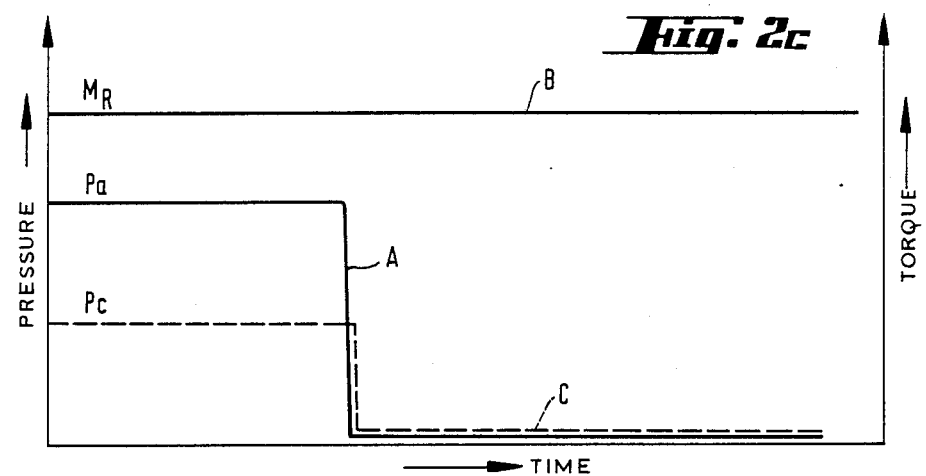
*Fig. 2c*

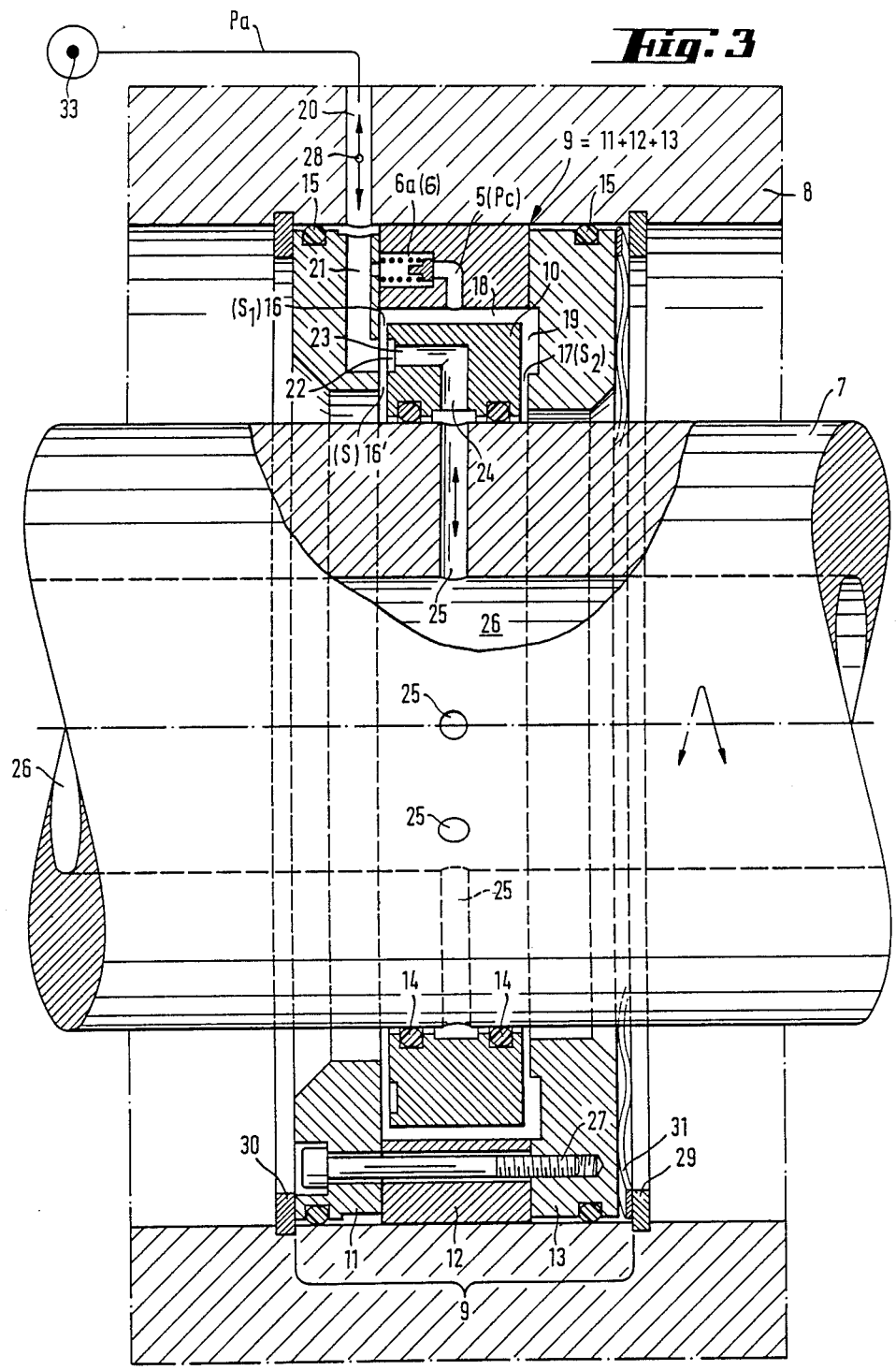

HYDROSTATIC ROTARY CONNECTOR WITH PRESSURE-EQUALIZING OR COMPENSATING ELEMENT

FIELD OF THE INVENTION

Our present invention relates to a hydrostatic rotary connector or joint with inverse gap control for the transmission of a fluid medium, usually a liquid, between a rotating machine part and a stationary machine part and wherein the joint includes a slide ring, i.e. a ring which generally is intended to move, as well as a counter ring in axially juxtaposed relationship and through which the fluid is transmitted, the two rings being axially displaceable relative to one another to control a gap defined between them.

More particularly, the invention relates to a joint or connector of the aforedescribed type wherein the rotatable or stationary machine part can be a shaft having an axial bore forming a passage into which the fluid is fed or from which the fluid is discharged, while the other machine part surrounds the shaft and is stationary when the shaft is rotatable or is rotatable when the shaft is stationary. The passage in this part generally is radially and the shaft can have the axial passage communicate with one or more radial bores so that communication is effected generally in a radial direction to and from the ring assembly formed by the two rings.

Needless to say, seals which can be mechanical seals, e.g. elastomeric rings, can be provided between the sliding ring and the movable part and between the counter ring and the stationary part.

BACKGROUND OF THE INVENTION

In a rotary connector of the type described, for example, in Thoma, J., *Einfurung in die Olhydraulik and die hydraulische Systemtechnick*, Gierardet Taschenbuch 18 (1973), 2nd Edition, Essen, Federal Republic of Germany. There is the danger that, under certain operational conditions, the relatively moving parts may actually contact one another directly when an equilibrium state is reached between a main pressure in the passage path through the gap, hereinafter referred to as a high pressure space, and an intermediate pressure in an intermediate pressure space communicating with the high pressure space by a leakage orifice slot whose width varies with the gap width between the rings, is reached.

Particularly critical are fast pressure changes, especially pressure drops in the main pressure region.

Stated otherwise, the sliding region is generally provided in an equilibrium state with respect to the counter ring when normal high pressure is maintained in the high pressure space and an intermediate pressure is maintained in the intermediate pressure space. The high pressure space, for example, may be the passages in the rings taken together with the gap between the axially confronting faces of the two rings at which their respective passages open.

Normally this gap communicates with the intermediate pressure space through an outlet or throttle slot or orifice, the width of which varies with the variation in the axial width of the gap. The pressure differential between the high pressure in the high pressure space and the intermediate pressure in the intermediate pressure space determines the axial position of the axially movable ring which, for convenience, will be here equivalent to the sliding ring.

Consequently, with the development of the undesirable conditions mentioned, such as rapid pressure drop in the main pressure steps, the equilibrium can be disrupted and the axially moveable ring can be driven forceably into direct contact with the other ring.

It follows, therefore, that the intermediate pressure responsible for maintenance of substantially constant dimensions of the gaps and thereby ensuring that viscous or fluid direction will be provided between the relatively moving surfaces instead of sliding friction or direct contact, will generally respond to an abrupt drop in the main pressure space with a lag so that at least some period of direct contact cannot be avoided.

Depending upon the response of the coupling with time and the magnitude of the change in the main pressure, a greater or lesser disruption of normal operation can be expected with disturbance in the uniformity of operation and with mechanical wear of significant parts of the system. The mechanical wear is associated with heating and unacceptable friction drag with the overall end result of increased leakage and possibly even breakdown of the coupling.

OBJECTS OF THE INVENTION

It is, therefore, the principal object of the present invention to provide an improved rotary connector with inverse gap regulation so that periodic or stochastic pressure changes of the main pressure will not adversely affect the reliability of the coupling or its function.

Another object of our invention is to provide a coupling of the type described but which is free from the drawbacks of the earlier system as described above.

SUMMARY OF THE INVENTION

These object and others which will become apparent hereinafter are attained, in accordance with the invention by providing a selectively actuatable compensator or pressure equalizer which is rendered effective upon a sudden drop in the main pressure to interconnect the main pressure space and the intermediate pressure space. This compensator is provided with or integrated between these two spaces and at least in part is included in one or both of the rings.

Utilizing the compensator of the invention, we are able in an efficient manner to provide inverse gap control by secondarily moving the intermediate pressure where the primary influence on the intermediate is, of course, the pressure transmitted to the intermediate space from the high pressure space through the orifice slot. The inverse gap control can adapt to new pressure conditions very dynamically, i.e. quickly, to immediately drop the intermediate pressure, for example, upon a drop in the pressure of the high pressure space before there has been any material displacement as a result of this drop of the axially shiftable ring.

Since such drops which generally occur during switching operations of hydraulic devices, are automatically responded to quickly and reliably by connecting the intermediate space to the high pressure space, the intermediate pressure will be rapidly and reliably adapted to the ratio between the main and intermediate pressures which is necessary for maintaining the force equilibrium upon the axially-movable ring and hence prevent direct contact of the axially-movable ring with the other ring.

Mechanical contact of structural parts and the disadvantageous consequence thereof including increased sliding friction, mechanical wear and heating, with the operational determinations thereof, are avoided.

Advantageously, the hydrostatic joint of the invention comprises:

a stationary machine part formed with a passage through which a fluid can flow under pressure;

a rotatable machine part rotatable relative to the stationary machine part and surrounded thereby, the rotatable machine part having a passage through which the fluid can flow under pressure;

a sliding ring and a counter ring surrounding the rotatable machine part and disposed between the machine parts and mutually juxtaposed axially, with at least one of the rings being shiftable axially toward the other of the rings, the sliding ring having a passage communicating with the passage in the rotatable part and opening at an axially facing surface of the sliding ring, the counter ring having a passage communicating with the passage in the stationary machine part and opening at a surface of the counter ring confronting the surface of the sliding ring, whereby the surfaces define a gap of controllable axial width between them, the gap and the passages in the rings forming a main pressure space substantially at a pressure $P_a$ of the fluid transmitted between the parts, the rings further defining between them an intermediate pressure space connected with the main pressure space through an orifice slot of width varying with the width of the gap and within which an intermediate pressure $P_c$ can develop as determined primarily by transmission from the main pressure space, the intermediate pressure $P_c$ being above a low pressure in a leakage space; and pressure-compensating means in at least one of the rings for secondarily modifying the pressure in the intermediate space by selectively interconnecting at least two of the spaces in response to predetermined relative magnitudes of the pressures in the high pressure and low pressure spaces.

BRIEF DESCRIPTION OF THE DRAWING

The above and other objects, features and advantages of the present invention will become more readily apparent from the following description, reference being made to the accompanying drawing in which:

FIG. 1 is a hydraulic equivalent-circuit diagram illustrating the principles of the prior art connector;

FIG. 1a is a diagram in which pressure and torque have been plotted along the ordinate versus time along the abscissa illustrating the operation of the equivalent circuit of FIG. 1;

FIG. 2 is an equivalent-circuit diagram similar to that of FIG. 1 but illustrating the principles of the present invention using inverse gap control and the pressure compensator or equalizer;

FIG. 2a is a diagrammatic cross section showing a valve arrangement which can be used for this purpose as the compensator permitting flow to the main pressure space;

FIG. 2b is an illustration of a valve which can be used in accordance with the principles of the invention but providing flow to a leakage space; and FIG. 2c is a diagram similar to the diagram of FIG. 1a illustrating the operation of the control system of the invention; and FIG. 3 is an axial section through the hydrostatic connector embodying the principal of this invention.

SPECIFIC DESCRIPTION

Referring first to FIG. 3 which shows the applicable structure of the hydraulic coupling, it can be seen that a rotary connector is provided for delivery of fluid between the stationary housing 8 and a shaft 7 constituting the two relatively rotatable machine parts, the shaft 7 being rotatable relative to and surrounded by the housing 8.

The shaft 7 is provided with an axial bore 26 and a housing 8 has a radial bore 20 constituting the respective fluid passages in these housing parts. The axial bore 25 opens into at least one and preferably a plurality of angularly equispaced radial bores 25 so that between the radial bores 25 and the radial bore 20 fluid communication can be established by a ring assembly.

The ring assembly (FIG. 3) comprises a slide ring 10 which generally rotates with the shaft 7 and which is sealed with respect to the latter by a pair of O rings 14 straddling the array of radial bores 25.

The counter ring, also referred to as a stationary ring has been represented at 9 and is shown to be made up of a number of parts.

One of these parts 11 confronts the end face of the sliding ring 10 at which a radial passage 24 opens via the axial section 23 into a gap. An axial section of a rotary passage 21 in the ring portion 11 communicates with the axial gap between the two rings and opens into the radial passage 20 of the housing 8.

The passages 21, 23, 24 and the axial gap between them constitute the main pressure space or high pressure space of the coupling.

The counter ring also comprises an annular portion 12 surrounding the ring 10 and a further disk allowing portion 13. The counter ring 9 is sealed with respect to the inner periphery of the housing part 8 by O ring seals 15 flanking the passage 21 and the passage 20.

The portions 11, 12 and 13 of the counter ring are held together by bolts 27, only one of which has been shown.

The annular orifice between the gap and an intermediate pressure space is represented at 16 and forms a throttle slot also identified as $S_1$, varying in cross section in accordance with the axial displacement of the sliding ring 10 under the fluid pressure differential thereacross.

The intermediate pressure space is formed by the clearance 19 between the sliding ring 10 and the ring 12 and between the rear axial face of the sliding ring 10 and the disk-shaped ring 13. The leakage path in to the leakage space from the intermediate pressure space 18, 19 is represented by the annular slot 17 which effectively forms a throttle valve $S_2$.

If one now considers this aspect of a rotary coupling in terms of an equivalent circuit and turns to FIG. 1, it will be seen that a true electrical equivalent circuit would involve a bridge half section having two active resistors variable in opposite senses or, stated otherwise, half of a bridge circuit with only active resistors.

In the construction illustrated, the resistors are, of course, throttles and the adjustability of the throttles is represented by the arrows.

Let us assume that the differential pressure which serves in FIG. 3 to position the sliding ring is applied to a piston 1 slidable in a hydraulic cylinder 3 by a pressure differential.

The pressure applied to face 3 of the piston, corresponding to the pressure applied to the left-hand side of the sliding ring 10, is the main fluid pressure $P_a$ which is transmitted along the hydraulic path through the rings from member 7 to member 8 or vice versa. In that case, the pressure applied to the other side 4 of the piston, corresponding to the right-hand side of the sliding ring 10 is therefore the pressure $P_c$. The throttle valves $S_1$ and $S_2$ are coupled by the nature of the system to vary inversely, i.e. throttle valve $S_1$ opens when throttle valve $S_2$ closes and vice versa.

We have not yet mentioned a further throttle valve which is present in the system, namely, a valve S represented at 16' in FIG. 3 and constituting the leakage path directly form the gap into the leakage steps. The leakage space, of course, is represented at L and is shown by the reservoir into which the throttle valves S and $S_2$ empty. The source of high pressure is represented at 33.

It will be apparent that as the ganged throttle valves, which are all coupled to the piston, like the throttles 16, 17 and 16' are coupled to the sliding ring 10, for every pressure change there will be a compensatory movement keeping the piston 1 and hence the sliding ring 10 in a stable position between the end positions so that referring again to a rotary connector, there will be no mechanical contact of the sliding ring with the counter ring 9.

However, under certain operational conditions as shown at A in FIG. 1a, when the main pressure $P_a$ drops quickly, the intermediate pressure $P_c$, represented by line C on the graph of FIG. 1a, does not drop equally quickly as a consequence, there is a residual force $F_c$ which in the absence of the countervailing forces $F_a$ normally provided by the high pressure side of the system, rapidly drives the piston 1 (and hence the sliding ring 10) to the left. This, of course, can immediately affect the throttle valves and result in seizing of the system.

In any event, the torque $M_R$ rises sharply before trailing off, thus disturbing the equilibrium of the system causing increased heat and other frictional detriments, wear and the like.

The system of the invention avoids these drawbacks by providing, as shown in FIG. 2, in an equivalent circuit form a connecting conduit 5 between the main pressure space $P_a$ and the intermediate pressure space $P_c$ together with a valve 6 which normally prevent flow from the main pressure $P_a$ to the intermediate pressure $P_c$.

This valve 6 can be a spring-biased check valve (see FIGS. 2a and 3) so that as soon as the intermediate pressure $P_c$ becomes greater than the main pressure $P_a$, the check valve 6a of FIG. 2a will open a connection from the intermediate pressure $P_c$ to the main pressure $P_a$ or to some location in the main pressure space or communicating therewith.

This communication is to the main pressure bore or passage 21 in FIG. 3.

The opening of the check valve 6a results in a immediate drop of the immediate pressure $P_c$.

In other words, the pressure in the intermediate pressure space 18, 19 in FIG. 3, will immediately match the new main pressure and thus drops equivalently or, in an extreme case, can drop to zero.

Turning to the diagram of FIG. 2c, therefore, it will be seen at the instant the main pressure $P_a$ (line A) rapidly falls, the check valve 6a will open when the main pressure $P_a$ reaches the intermediate pressure $P_c$ (line C). Because the intermediate pressure follows correspondingly the downward course of the main pressure from that point on, there is no axial shift of the sliding ring 10 into forcible contact with the ring 11 and hence no torque increase so the torque $M_R$ continues as a straight line B.

Turning once again to FIG. 3, therefore, it can be seen that the central ring 12 is provided with a check valve 6a or, if desired, a valve 6b as shown in FIG. 2b for discharging the pressure $P_c$ to the leakage space L.

The valve 6a is provided in the passage 5 here connected between the low pressure space 18, 19 and the high pressure space as represented by the passage 21. When the embodiment of FIG. 2b is applicable, the connection to passage 18 will be replaced by a connection extending axially directly through the rings 12 and 13 to open into the leakage space and the valve 6a will be replaced by a pressure relief valve responsive to the pressure differential between the two pressure spaces, but venting the pressure from the intermediate pressure space 18, 19 to the leakage space L.

In FIG. 3, of course, the axial dimension of the slide ring is less than that of the spacer ring 12 between the rings 11 and 13 so that the throttle orifices 16 and 16' are provided between the ring 10 and the part 11 while the throttling orifice 17 is provided between the ring 10 and the disk-shaped ring member 13.

The seals 14 and 15 not only provide fluid sealing effects but also allow torque transmission so that, for example, the sliding ring 10 is entrained with the shaft 7 while the ring 9 is held against rotation by the seals 15 bearing on the housing 8.

The elastic seals 14 also permit a small degree of axial motion of the sliding ring 10 as well as wobbling between the parts and their respective rings.

The stationary ring 9 can be axially fixed between stops or retaining rings 29 and 30. Advantageously the retaining ring 29 is braced against the disk-shaped ring 13 by an elastic element 31. this arrangement provides a small pretension for the stationary ring 9 and allows it to a limited degree of axial immobility.

The apparatus as thus described provides inverse gap control in the sense that the relative axial displacement of the rings 9 and 10 with respect to one another widens the throttle orifices on one side as it simultaneously narrows the throttle orifices on the other side of the ring 10. The sealing rings 14 and 15 may resist any displacement relative to the respective parts and to a certain extent form restoring springs to reshape the correct position of the shaft 7 within the housing 8 and thereby parallelism of the gaps.

In operation, the pressure medium can flow through the bore 20 in the chamber 8, through the main pressure bore in part 11, through the annular groove 22, through a connection duct 23 and the blind the bore 24 in the slide ring 10 and finally through the rotary bores 25 and the axial bore 26 in shaft 7 to the consuming unit.

As soon as the pressurized liquid is admitted to the rotary connector, the gaps 16, 17 form a pressure divider which results in the buildup of the intermediate pressure $P_c$ in the intermediate pressure space formed by the annular channel 18 and groove 19.

In the spacer ring 12 and the part 11 of the stationary ring, the connecting passage 5 is formed as has been previously mentioned and connects the main pressure bore 21 with the intermediate pressure space 18, 19. The compensator or pressure equalizer is represented by the check valve 6a and is located in the spacer ring 12 to control flow through the conduit 5. The bypass 5 is normally blocked.

In the case of a sudden drop in the main pressure $P_a$, the check valve 6a opens as noted so that the intermediate pressure $P_c$ will drop. There is no tendency, therefore, any longer to shift the ring 10 to the left into engagement with the ring 9.

While the liquid stream has been described as flowing from the stationary part 8 to the rotating part 7, the double-headed arrow 28 is intended to indicate that a reverse flow is also possible.

We claim:

1. A rotary connector with inverse gap control for transmission of fluid flow, comprising:
    a stationary machine part formed with a passage through which a fluid can flow under pressure;
    a rotatable machine part rotatable relative to said stationary machine part and surrounded thereby, said rotatable machine part having a passage through which said fluid can flow under pressure;
    a sliding ring and a counter ring surrounding said rotatable machine part and disposed between said machine parts and mutually juxtaposed axially, with at least one of said rings being shiftable axially toward the other of said rings, said sliding ring having a passage communicating with said passage in said rotatable part and opening at an axially facing surface of said sliding ring, said counter ring having a passage communicating with said passage in said stationary machine part and opening at a surface of said counter ring confronting said surface of said sliding ring, whereby said surfaces define a gap of controllable axial width between them, said gap and said passages in said rings forming a main pressure space substantially at a pressure $P_a$ of the fluid transmitted between said parts, said rings further defining between them an intermediate pressure space connected with said main pressure space through an orifice slot of a width varying with the width of said gap and within which an intermediate pressure $P_c$ can develop as determined primarily by transmission from said main pressure space, said intermediate pressure $P_c$ being above a low pressure in a leakage space; and
    pressure-compensating means in at least one of said rings for secondarily modifying the pressure in said intermediate space by selectively interconnecting at least two of said spaces in response to predetermined relative magnitudes of the pressures in said main pressure and low pressure spaces.

2. The rotary connector defined in claim 1 wherein one of said rings is provided with a bypass connecting said intermediate pressure space with one of the other spaces and said pressure-compensating means includes a valve in said bypass displaceable by a pressure differential between said main pressure space and said intermediate pressure space representing a sudden drop in the pressure in said main pressure space.

3. The rotary connector defined in claim 2 wherein said valve is constructed and arranged to open communication through said bypass when said pressure $P_a$ in said main pressure space falls below the intermediate pressure $P_c$.

4. The rotary connector defined in claim 3 wherein said bypass interconnects said main pressure space and said intermediate pressure space and said valve is a check valve.

5. The rotary connector defined in claim 3 wherein said bypass is provided between said intermediate pressure space and said leakage space.

6. The rotary connector defined in claim 3 wherein said valve is located in said counter-ring.

7. The rotary connector defined in claim 3, further comprising means axially engaging said counter-ring on opposite sides for limiting axial displaceability of said counter-ring in said stationary machine part.

8. The rotary connector defined in claim 7, further comprising a pair of O rings interposed between said sliding ring and said rotatable machine part for enabling rotary entrainment of said sliding ring with said rotatable machine part, while permitting axial displacement of said sliding ring on said rotatable machine part.

9. The rotary connector defined in claim 8 wherein said counter-ring is assembled from two dis-shaped annular elements and a spacer interposed axially between said disk-shaped annular elements.

10. The rotary connector defined in claim 9, further comprising a pair of O rings sealingly interposed between said counter-ring and said stationary machine part.

11. The rotary connector defined in claim 10 wherein said rotatable machine part is an axial bore and said rotatable machine part is a shaft, a plurality of radial bores communicating with said axial bore and opening into an annular groove formed in said sliding ring.

12. The rotary connector defined in claim 11 wherein said passage in said stationary machine part has a radial bore and said sliding ring and said counter-ring each have radial bores coplanar with the radial bores of said shaft and said stationary machine part, respectively.

* * * * *

UNITED STATES PATENT AND TRADEMARK OFFICE
CERTIFICATE OF CORRECTION

PATENT NO. : 4,844,124

DATED : 4 July 1989

INVENTOR(S) : Bodo STICH et al

It is certified that error appears in the above-identified patent and that said Letters Patent is hereby corrected as shown below: Title page:

Item [30] Second Foreign Application Priority Data to read:

--Apr. 14, 1988 [DE] Fed. Rep. of Germany ...3812363 --.

Signed and Sealed this

Seventh Day of August, 1990

*Attest:*

HARRY F. MANBECK, JR.

*Attesting Officer*   *Commissioner of Patents and Trademarks*